(12) United States Patent
Aunitzky et al.

(10) Patent No.: US 8,288,677 B2
(45) Date of Patent: Oct. 16, 2012

(54) COUPLING DEVICE FOR A WATER VAPOR CUTTING DEVICE

(75) Inventors: Ernst Aunitzky, Pettenbach (AT); Wolfgang Haberler, Scharnstein (AT); Roland Ortner, Pettenbach (AT); Heribert Pauser, Grafenwörth (AT); Max Stöger, Vorchdorf (AT); Martin Trausner, Sattledt (AT); Andreas Wiesinger, Wels (AT)

(73) Assignee: Fronius International GmbH, Pettenbach (AT)

( * ) Notice: Subject to any disclaimer, the term of this patent is extended or adjusted under 35 U.S.C. 154(b) by 1192 days.

(21) Appl. No.: 11/991,631

(22) PCT Filed: Sep. 6, 2006

(86) PCT No.: PCT/AT2006/000367
§ 371 (c)(1),
(2), (4) Date: Mar. 7, 2008

(87) PCT Pub. No.: WO2007/028184
PCT Pub. Date: Mar. 15, 2007

(65) Prior Publication Data
US 2009/0114069 A1   May 7, 2009

(30) Foreign Application Priority Data
Sep. 9, 2005  (AT) ................ A 1479/2005

(51) Int. Cl.
*B23K 10/00* (2006.01)
(52) U.S. Cl. .......... 219/121.39; 219/121.36; 219/121.48
(58) Field of Classification Search ............. 219/121.36, 219/121.39, 121.45, 121.48, 75, 121.59
See application file for complete search history.

(56) References Cited

U.S. PATENT DOCUMENTS

| 3,242,305 | A | | 3/1966 | Kane et al. |
| 3,620,424 | A | * | 11/1971 | Grigsby ........................ 222/410 |

(Continued)

FOREIGN PATENT DOCUMENTS

EP    1 050 200    11/2000

(Continued)

OTHER PUBLICATIONS

Japanese Examination Report dated Mar. 1, 2011 in Japanese Patent Application No. 2008-529413 (With English translation).

(Continued)

*Primary Examiner* — Mark Paschall
(74) *Attorney, Agent, or Firm* — Collard & Roe, P.C.

(57) ABSTRACT

The invention relates to a coupling device (24) used for producing a flow path between the tank (6) of a water vapor cutting device (1) and a liquid-filled cartridge (25), wherein said coupling device (24) comprises a housing (29) provided with a receiving area (30) which is formed therein, used for mounting the cartridge (25) on said housing (29) and which comprises a channel (39) provided with an input orifice (40) fluidically connectable to the cartridge (25) and to an output opening (41) which is also fluidically connectable to an external surrounding area, for example to the tank (6). A metering device (38) is arranged in the housing (29) and makes it possible to define a locking position, in which the cartridge (25) is not mounted on the housing (29) and the output orifice (41) is locked, wherein the metering device (38) also makes it possible to define a releasing position, in which said metering device (38) is displaceable, in particular by mounting the cartridge (25) on the housing (29), and in which the output orifice (41) is released. A method for controlling the water vapor cutting device (1) is also disclosed.

15 Claims, 4 Drawing Sheets

U.S. PATENT DOCUMENTS

| | | | |
|---|---|---|---|
| 3,665,244 A | 5/1972 | Kugler | |
| 4,182,388 A | 1/1980 | Sellen | |
| 5,717,187 A | 2/1998 | Rogozinski et al. | |
| 5,975,163 A * | 11/1999 | Gianfranco | 141/313 |
| 6,326,581 B1 * | 12/2001 | Laimer et al. | 219/121.39 |
| 7,195,228 B2 | 3/2007 | Tiberghien et al. | |
| 2007/0215068 A1 | 9/2007 | Langeder et al. | |

FOREIGN PATENT DOCUMENTS

| | | |
|---|---|---|
| EP | 1 561 991 | 8/2005 |
| JP | 50-035399 | 11/1975 |
| JP | 02 085153 | 3/1990 |
| JP | 07-080287 | 3/1995 |
| JP | 2004-111137 | 4/2004 |
| JP | 2004-268089 | 9/2004 |
| WO | WO 99/38365 | 7/1999 |
| WO | WO 2005/110659 | 11/2005 |

OTHER PUBLICATIONS

International Search Report.
European Search Report dated Mar. 6, 2012 in European Application No. 06 774 765.9 (with English translation of relevant parts).

* cited by examiner

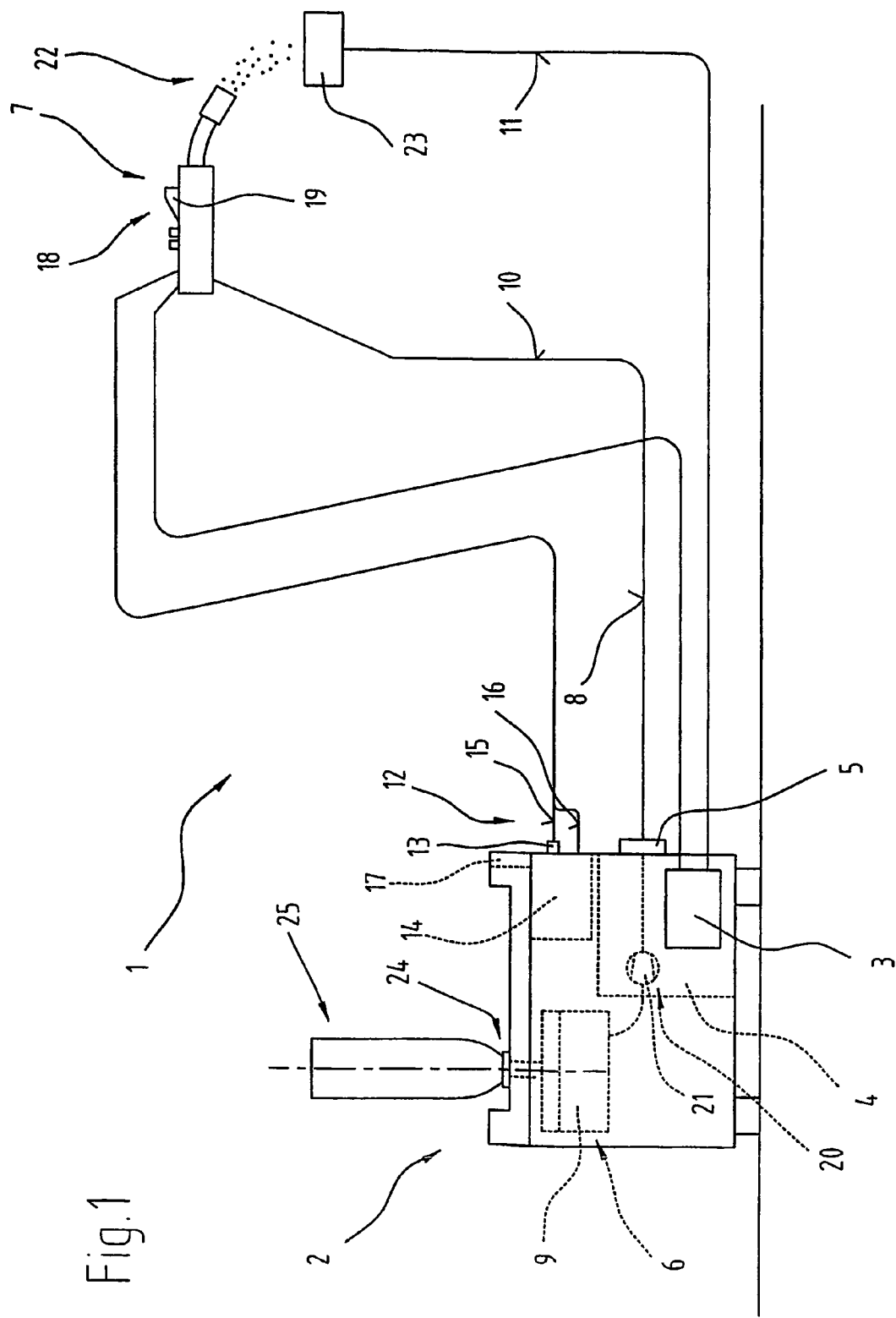

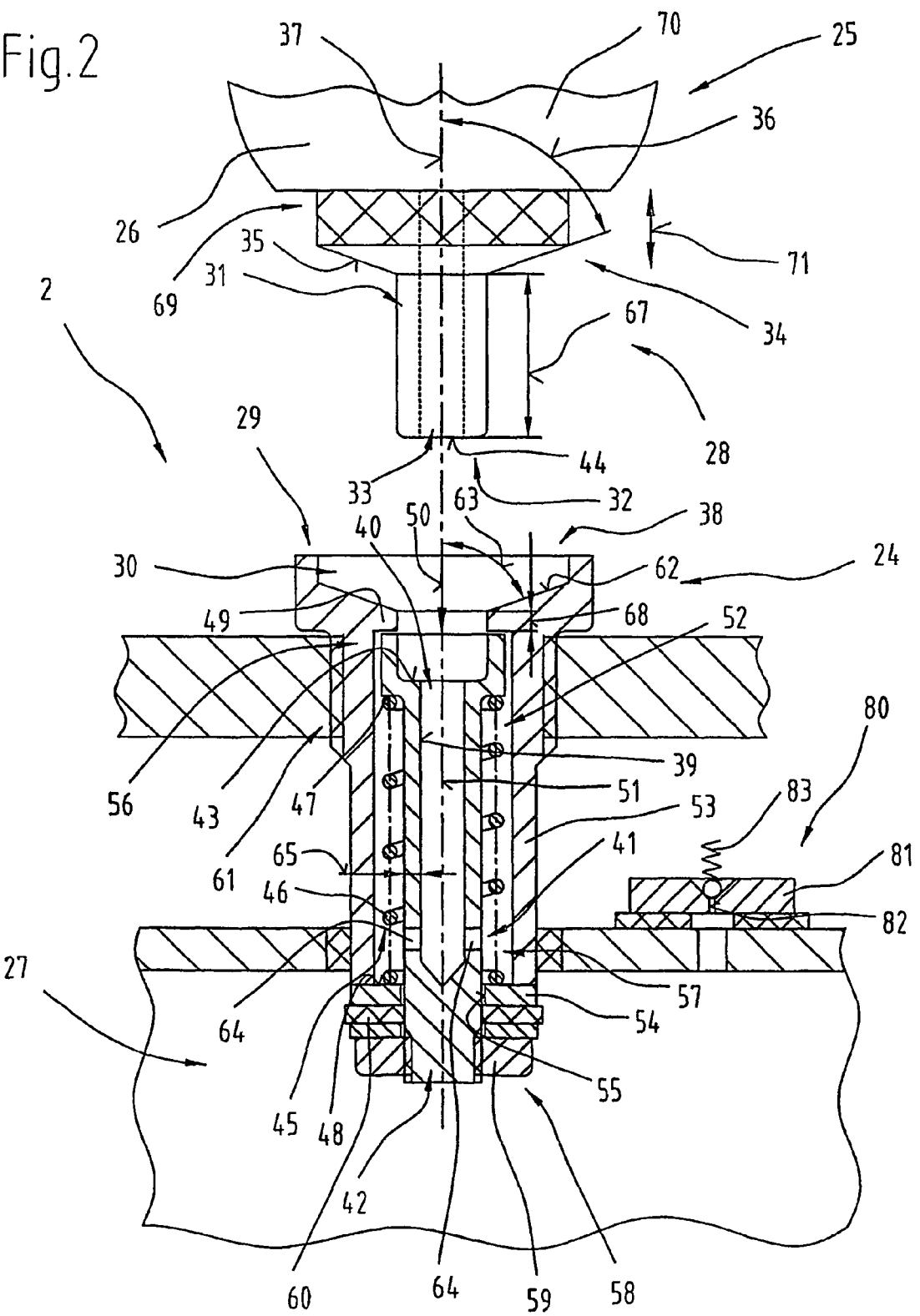

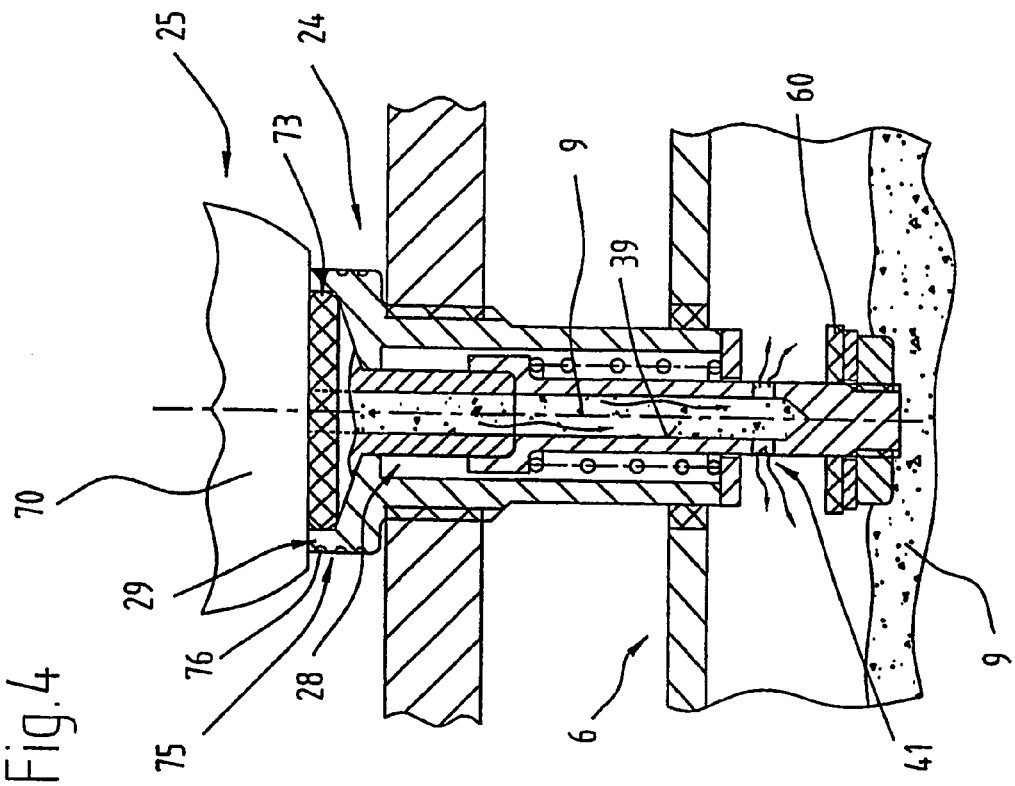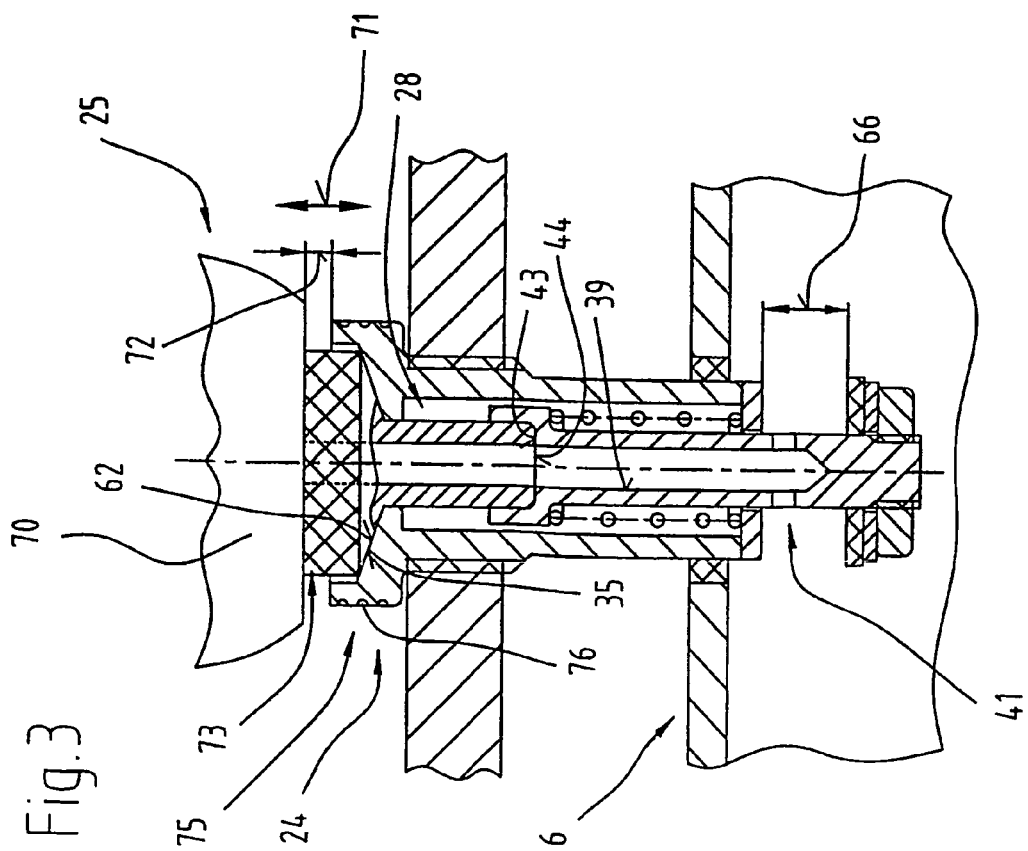

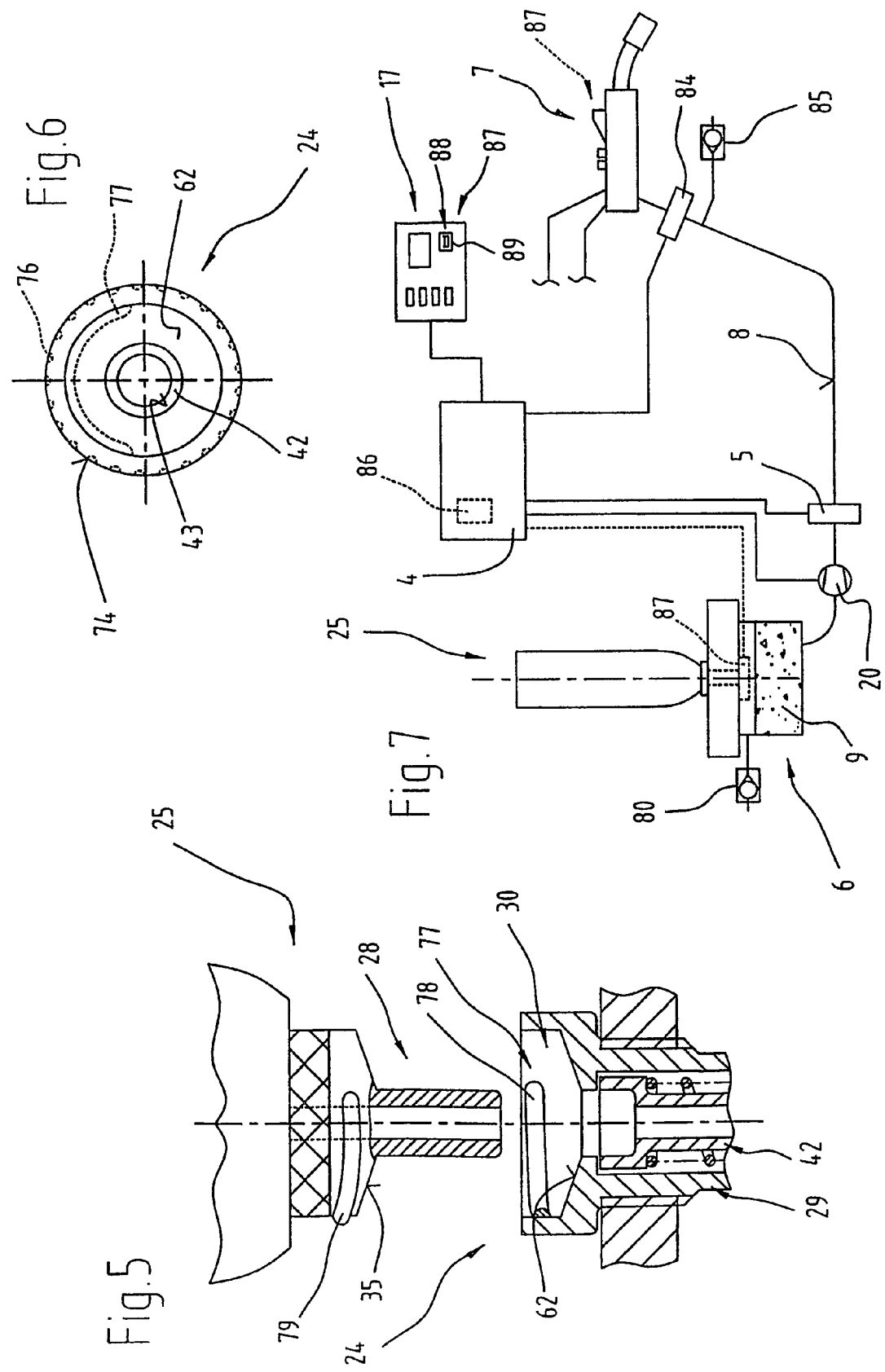

COUPLING DEVICE FOR A WATER VAPOR CUTTING DEVICE

BACKGROUND OF THE INVENTION

1. Field of the Invention

The present invention relates to a coupling device used for producing a flow path between a tank of a water vapor cutting device and a liquid-filled cartridge, wherein said coupling device comprises a housing provided with a receiving area formed therein for mounting said cartridge on said housing, and which coupling device comprises a channel provided with an input orifice fluidically connectable to said cartridge and with an output orifice fluidically connectable to an external surrounding area, for example to a tank.

Furthermore, the present invention relates to a water vapor cutting device provided with at least one tank for a liquid, a current source, a control device, and a cutting torch for producing a cutting beam exiting from a nozzle, which torch is connected to said tank via a feed line.

The present invention also relates to a control device for a water vapor cutting device provided with a storage element for process parameters and process procedures, which device is connected to a current source and a feeding device for liquids, particularly a pump or a locking element and/or a locking member of said water vapor cutting device, wherein said water vapor cutting device is provided with a tank that may be filled with liquid and a cutting torch connected to said tank and said current source.

Finally, the present invention relates to a method for controlling a water vapor cutting device, wherein the mode of operation of said water vapor cutting device is controlled by means of a control device by transmitting signals to a current source and to a liquid feeding device so that said liquid may be supplied from a fillable tank to a cutting torch and said cutting torch may be supplied with electric power from the current source if necessary.

2. The Prior Art

EP 1 050 200 B1 discloses a water vapor cutting device provided with at least one container for a liquid, a current source, a control device, and a cutting torch connected to said container or tank via a feed line to produce a water vapor plasma beam exiting via a nozzle. Said container may be designed as or may be connected to an exchangeable gas bottle or gas cartridge having a pre-defined internal pressure. Such pressure container allows supply of liquid from said container to said cutting torch without requiring a pump. For example, in a described embodiment the gas from said gas bottle flows into said container holding liquid and forms a pressure cushion forcing said liquid out of an exit opening of said container.

However, EP 1 050 200 B1 does not disclose how said tank of said cutting device is filled with liquid from a cartridge. Only one embodiment shows that this may be effected using an open container and a filling vent. This, however, proves hardly comfortable because it requires a locally fixed infrastructure, e.g. a connection to a water pipe, to fill said container, which can not be transported once it is filled. In addition, filling said tank takes a lot of time because said liquid flows into said tank only rather slowly as no additional pressure is applied. Therefore, it would be helpful to have a water vapor cutting device wherein said liquid may be filled in as independently of any infrastructure as possible. Moreover, the resources, particularly water, should be used as efficiently as possible, i.e. the liquid should be transferred into the tank without leaving a residue, without the risk of spilling, and as quickly as possible.

The above prior art systems also have the disadvantage that the liquid in the container can not be used up completely to subsequently re-fill the container. This may cause malfunctioning of the cutting process or may damage the torch because when the tank is emptied, air may be sucked into the lines or the tank, so that the system can not be guaranteed to operate properly any more. This means that, disadvantageously, the liquid resources can not be used optimally. However, it should be ensured that a cutting process may be carried out properly after the tank has been filled, i.e. that there are no air bubbles in the feed line leading to the cutting torch that may hinder the generation of water vapor and thus negatively affect the cutting process.

SUMMARY OF THE INVENTION

The object of the present invention is to overcome the prior art disadvantages mentioned above, to improve mobility and efficiency of a water vapor cutting device, and to provide the respective devices and methods for this purpose. In particular, the liquid resources used for the cutting process of a water vapor cutting device should be used more efficiently.

The object of the present invention is achieved individually by a coupling device wherein a metering device is provided in the housing, said metering device defining a locking position wherein no cartridge is mounted on said housing and the output orifice is locked, and said metering device also defining a releasing position into which said metering device is displaceable, particularly by mounting the cartridge on the housing, and in which the output orifice is released. This embodiment is advantageous because the metering device of the coupling device also functions as a lock valve being opened mechanically when the cartridge is mounted. As opposed to prior art embodiments, wherein a certain minimum pressure inside the cartridge is required to open a check valve or similar, in the present invention no excessive pressure inside the cartridge is required to bring the coupling device from the locking position into the releasing position. This is particularly advantageous because the cartridge may be emptied to a very large extent, because when it is almost completely empty the excessive pressure inside the cartridge is relieved and the remaining liquid may flow out of the cartridge under essentially atmospheric pressure. Thus, the liquid resources may be exploited more fully, reducing costs and saving resources.

In another advantageous embodiment, the channel having an output orifice is arranged in a hollow bolt held in the housing so as to be displaceable in the direction of a longitudinal central axis. A metering device of such design allows the coupling device to take two positions, i.e. the locking position and the releasing position, by displacing the hollow bolt, not requiring any complicated construction.

Because the output orifice is located in an end area of said hollow bolt, said hollow bolt advantageously has to be displaced only over a short distance in the longitudinal direction to bring the output orifice in the releasing position outside the housing.

Further, advantageously, at least one bore is provided in the end area of said hollow bolt extending across the thickness of the wall in a transverse direction with respect to said longitudinal central axis. Thus, in the locking position said output orifice may easily be provided within said housing, with said output orifice being covered by a side wall of said housing.

As in the locking position said output orifice is covered or locked by a side wall of said housing, it is not necessary to provide a separate locking mechanism for said output orifice, thus allowing the coupling device to be of a simple and compact structure.

In this context, in a practical embodiment said output orifice in the releasing position may be provided outside said housing by displacing it over a defined displacement range. This allows easy displacement of said output orifice when the cartridge, particularly a dispenser, is of appropriate structure.

Providing the metering device in the receiving area with a stop surface for a dispenser of said cartridge, which defines the displacement range, is a simple and effective way of positioning said cartridge on said coupling device in the mounted position on said coupling device.

In a particularly advantageous embodiment, said stop surface is beveled at an angle with respect to said longitudinal central axis of said housing, said angle preferably corresponding to an angle at which a stop surface of said cartridge is beveled, because this allows said cartridge to take a position on said coupling device that is defined in all spatial directions. Moreover, said stop surface of said cartridge or housing defines the displacement range, i.e. the releasing position. In this respect, it is also advantageous that certain types of cartridges having a manually deactivated locking mechanism for the inside chamber may easily be opened in this position by applying a force to a cartridge container mounted on said coupling device, so that the locking mechanism will release the chamber inside said cartridge, thus providing a flow connection between said inside chamber and the channel. This prevents the liquid from being spilled when filling the tank.

Advantageously, a dispenser of said cartridge is formed by a trunnion, particularly a trunnion shaped as a hollow cylinder, and by said stop surface, with said displacement range between the locking and the releasing positions being determined by one length of said trunnion. Thus, when mounting on said coupling device, said trunnion of said dispenser may first engage with said hollow bolt and displace it until said stop surface of said dispenser comes to rest on said housing.

In an end area where said input orifice is provided, said hollow bolt is provided with a stop surface for said trunnion of said dispenser of said cartridge. Therefore, the displacement range may e.g. be varied by varying the length of said trunnion.

In a further advantageous embodiment, in a filling position, wherein an orifice or said locking mechanism of said cartridge is open or deactivated and said metering device is positioned in the releasing position, a flow connection is provided between a chamber inside said cartridge and said channel. Such filling position, which is taken when said coupling device is in the releasing position, ensures that the liquid from said cartridge will only flow into said tank. Moreover, the tank filling process may be controlled by a user, and optionally only part of the content of said cartridge may be filled into said tank.

Advantageously, said metering device is provided with an elastic element, particularly a spring or an elastic cushion holding said hollow bolt or said output orifice in the locking position. This allows easy definition of said locking position, and said coupling device is easily brought into the releasing position by overcoming the force of said spring, as explained above.

Suitably, said housing is shaped like a tube, particularly like a hollow cylinder.

Moreover, advantageously, the end area of said hollow bolt is provided with a stop element and/or a sealing element which, in the locking position, is adjacent to a front surface of said housing. Thus, said hollow bolt, pre-stressed by said elastic element, may be positioned in the locking position by said stop element. In addition, the chamber inside said housing, where the channel having said input and output orifices is provided, may be sealed by said sealing element in the channel output orifice area. Therefore, in the locking position of said coupling device, said chamber inside said tank is sealed tightly against the outside. This is particularly advantageous because when said coupling device is in the locking position, no gas or liquid may leak through the channel from said tank, on which said coupling device is provided.

Another individual way to achieve the objects of the present invention relates to a water vapor cutting device, wherein the tank is provided with a coupling device according to any one of claims 1 to 14 or according to the above description, and wherein, in the releasing position of said coupling device, a chamber inside said tank is fluidically connected to said output orifice of said channel of said coupling device. Allowing the use of liquid cartridges, such water vapor cutting device may be used in a very flexible and mobile way, also allowing highly efficient use of liquid resources. Therefore, said tank requires less frequent fillings, resulting in less maintenance requirements for maintenance personnel.

As said tank is provided with a de-gassing device, the air displaced by liquid when filling the tank may escape, thus allowing swift filling of said tank without any problems.

An embodiment wherein the cutting torch or the line are provided with a de-gassing device is advantageous because any air or gas that may be present in said components may escape, allowing uninterrupted liquid supply to said cutting torch.

If said cutting torch or said line is provided with a locking member connected to the control device, the liquid may, advantageously, not escape from said cutting torch when said line and said cutting torch are re-filled with said liquid. Optionally, a certain excess pressure may be generated, but at least said liquid will be distributed without bubbles in said line or cutting torch.

Another individual way to achieve the objects of the present invention refers to a control device wherein definitions for carrying out a maintenance mode, particularly a filling mode, are stored in a storage element, allowing checking and/or restoration of operability of said water vapor cutting device, and wherein an activating element is coupled with said control device, said activating element being designed such that said maintenance mode is initialized when said activating element is actuated or when a filling incident is detected.

Designing said activating element as an operating element, particularly a key, gives a user an additional opportunity for adjusting said water vapor cutting torch, which helps improve the cutting process.

Easy operation by the staff is achieved by providing said operating element on an input and/or output device of said water vapor cutting device.

For easy operation, it is also suitable to arrange said operating element on said cutting torch.

Also, said activating element may be formed by a detecting means, particularly a sensor, provided to monitor said tank. This means that said control device may detect whether or not said tank has been filled, thus allowing the maintenance mode to be initialized automatically or in conjunction with this incident.

Said detecting means may be coupled with said coupling device which particularly has the characteristic features mentioned above, for monitoring said coupling device, with said detecting means detecting whether or not a cartridge is being coupled to said tank.

Furthermore, the object of the present invention is individually achieved by a method wherein, depending on an activating element, a maintenance procedure, particularly a filling mode, is called by a control device, during which mode or procedure operability of said water vapor cutting device, particularly the presence or distribution of liquid in the line and in the cutting torch, is checked and/or restored, and to restore operability, liquid is supplied into said cutting torch and into said line leading to said torch without said cutting torch carrying out a cutting process. Such embodiments or methods advantageously allow more efficient use of the liquid in the tank. The maintenance mode ensures that operability of the water vapor cutting torch will be restored even after the tank has been emptied completely or to a large extent. For this purpose, the distribution of liquid in the cutting torch and in the line is brought back to normal levels, removing enclosed air etc. Thus, after carrying out a maintenance mode, a cutting process may be carried out properly.

Advantageously, before carrying out a cutting process using the cutting torch, the activating element is actuated or activated via a coupling device particularly having the characteristic features mentioned above, after the tank has been filled for the first time or re-filled. This is a security measure that may have to be carried out before starting the subsequent cutting process, thus increasing total process safety.

Suitably, the relevant parameters for carrying out a maintenance procedure are called from a storage element, and the liquid supply device, particularly a pump, a locking element of said supply device, and/or a locking member in the area of the cutting torch are controlled accordingly, because the use of prior art electronic control devices, particularly microprocessor controls, allows flexible and adjustable control of various components depending on program routines stored in said storage element.

A method wherein during a maintenance procedure a flow control device or a pressure control device check whether or not the cutting torch or the feed line are supplied with liquid, optionally by applying a minimum pressure to said line, is advantageous because it allows determination of whether or not operability of said water vapor cutting device has been restored.

As during a maintenance procedure the line and the cutting torch are degassed, particularly via a degassing means, any enclosed air that might cause malfunctioning of the cutting process may be removed.

BRIEF DESCRIPTION OF THE DRAWINGS

The present invention will now be explained in greater detail using the attached drawings, which are schematic representations, wherein FIG. 1 is a side view of an embodiment of a water vapor cutting device;

FIG. 2 is a section through a coupling device of a tank of the water vapor cutting device according to FIG. 1 in the locking position;

FIG. 3 is the coupling device according to FIG. 2 in the releasing position, with the liquid cartridge closed;

FIG. 4 is the coupling device according to FIG. 3 with the liquid cartridge opened to fill the tank of the water vapor cutting device;

FIG. 5 is a detailed view of another embodiment of the coupling device having a liquid cartridge;

FIG. 6 is a top view of a coupling device according to FIGS. 2 to 5;

FIG. 7 is a functional scheme of another embodiment of the water vapor cutting device.

FIG. 1 shows a water vapor cutting device 1 for a water vapor cutting process, provided with a supply device 2. Said supply device 2 comprises a current source 3, a control device 4, a locking element 5 assigned to said control device 4, and a tank 6. Said locking element 5 is connected to said tank 6 and to a tool formed by a cutting torch 7 via a feed line 8, so that said cutting torch 7 may be supplied with liquid 9 provided in said tank 6, particularly water. Said cutting torch 7 is supplied with energy, particularly current and voltage, via lines 10, 11 from said supply device 2.

DETAILED DESCRIPTION OF THE PREFERRED EMBODIMENTS

For cooling, said cutting torch 7 is optionally connected to a liquid-filled container 14 via a cooling circuit 12 optionally equipped with a flow control device 13. When said cutting torch 7 or said supply device 2 are put into operation, said cooling circuit 12 may be started by said control device 4, thus cooling said cutting torch 7 via said cooling circuit 12. Said cutting torch 7 is connected to said liquid-filled container 14 via cooling lines 15, 16 to form said cooling circuit 12. Said cutting torch 7 may also be cooled by said liquid 9 to be vaporized provided in said tank 6, which liquid is transported to said cutting torch 7 via said feed line 8. In this case, a separate cooling circuit 12 may not be necessary.

Furthermore, said supply device 2 has an input and/or output device 17 for setting and/or displaying various parameters and modes of operation of said water vapor cutting device 1. The parameters set via said input and/or output device 17 are communicated to said control device 4, which will then activate the individual water vapor cutting device 1 components accordingly.

Of course, said cutting torch 7 need not necessarily be connected to said supply device 2 via said individual lines 8, 10, 11, 15, 16, as shown in the present embodiment, but at least some of said individual lines 8, 10, 11, 15, 16 may also be taken together in a hose assembly (not shown) connected to said cutting torch 7 and said supply device 2 via a coupling element, particularly a connecting plug.

In addition, said cutting torch 7 may be provided with at least one first operating element 18, particularly a push button 19. From said first operating element 18, particularly said push button 19, a user may order said control device 4 from said cutting torch 7 to start or carry out a water vapor cutting process by activating and/or de-activating said element 18. Furthermore, said input and/or output device 17 may e.g. be used for pre-setting, particularly pre-defining the material to be cut, the liquid to be used, and e.g. current and voltage characteristics. Said cutting torch 7 may of course be equipped with further operating elements for setting one or more operation parameters of said water vapor cutting device 1 from said cutting torch 7. Said operating elements may be connected to said supply device 2, particularly to said control device 4, directly via lines or via a bus system.

When said first operating element 18 is actuated, said control device 4 will activate the individual components necessary for the water vapor cutting process. For example, first a feeding device 20 for said liquid 9, particularly a pump 21, a blocking element 5, and said current source 3 are activated, thus starting supply of said cutting torch 7 with said liquid 9 and electric power. Subsequently, said control device 4 will optionally activate said cooling circuit 12, thus allowing cooling of said cutting torch 7. As said cutting torch 7 is supplied with liquid 9 and energy, particularly current and voltage, said liquid 9 in said cutting torch 7 is transformed into high temperature gas 22 or vapor, and a plasma column is generated so that said gas 22 exiting said cutting torch 7 may be used to cut a work piece 23. The exact process of transforming said liquid 9 into said gas 22 may be learned from AT 406 559 B by the present applicant.

FIG. 2 is a detailed view of the water vapor cutting device 1 in the area of tank 6. A coupling device 24 is provided on said tank 6, on which coupling device a cartridge 25 or a pressure gas pack may be mounted. Said coupling device 24 serves to provide a connection between a chamber 26 inside said cartridge 25 and a chamber 27 inside said tank 6, so that medium may flow from said chamber 26 inside said cartridge 25 into said tank 6.

Said cartridge 25 contains at least said liquid 9, particularly water, and said chamber 26 inside said cartridge 25 is preferably under excessive pressure, so that said liquid 9 will exit at high speed when a dispenser 28 is opened. Such cartridges 25 are known from prior art, so its construction and function to produce excessive pressure are not discussed in greater detail here. Advantageously, the construction of the coupling device 24 according to the present invention even allows use of cartridges 25 or containers having no excessive pressure, i.e. having atmospheric pressure.

Said coupling device 24 has a housing 29 provided with a receiving area 30. Said receiving area 30 is designed such that said cartridge 25 with its dispenser 28 may be mounted on said housing 29. In the embodiment shown, said dispenser 28 of said cartridge 25 is formed by a cylindrical trunnion 31 having an output orifice 33 at a front surface area 32. The end area 34 of said trunnion 31 opposite said front surface area 32 has a stop surface 35 which is particularly beveled at an angle 36 with respect to a longitudinal central axis 37 of said cartridge 25.

Furthermore, said coupling device 24 has a metering device 38 allowing control of filling said tank 6 by means of said cartridge 25. For this purpose, a channel 39 is assigned to said metering device 38, which channel has at least one input orifice 40 and one output orifice 41. Said input orifice 40 may be flowingly connected to said output orifice 33 of said cartridge 25, and said output orifice 41 of said metering device 38 may be opened to the outside, in particular, it may be flowingly connected to said chamber 27 inside said tank 6.

Said metering device 38 is formed such that said coupling device 24 may at least take one locking position and one releasing position. In the locking position defined by said metering device 38, said output orifice 41 of said channel 39 is closed, so that no liquid may exit through said channel 39. In the releasing position, said output orifice 41 of said channel 39 is open and accessible from outside, so that any liquid present in said channel 39 may exit through said output orifice 41.

In the normal state, i.e. when said metering device 38 is not subject to any outside forces, said coupling device 24 is in the locking position. Said coupling device 24 may be brought from the locking position into the releasing position by means of said metering device 38. Preferably, this is effected by mounting said cartridge 25 on said receiving area 30 of said coupling device 24, with said mounting causing displacement of said output orifice 41 and said channel 39.

In order to allow this to happen, in the present example said channel 39 is provided in a hollow bolt 42 held in said housing 29 so as to be longitudinally displaceable. In said receiving area 30, a front stop surface 43 is provided on said hollow bolt 42, and when said cartridge 25 is mounted on said coupling device 2, said stop surface 43 will contact one front surface 44 of said trunnion 31 of said cartridge 25.

Furthermore, said metering device 38 is provided with an elastic element 45, particularly a spring 46, an elastic cushion, or something similar that holds said hollow bolt or said output orifice in the locking position when not under pressure or stress. Said spring 46 is e.g. provided inside said housing 29, and it rests on a supporting surface 47 of said hollow bolt 42 and on a supporting surface 48 of said housing 29, as shown in FIG. 2. In this case, said spring 46 is a pressure spring optionally forcing said hollow bolt 42 against a projection 49 of said housing 29, thus allowing definition of the locking position of said coupling device 24.

When said hollow bolt 42 is subjected to a force in the direction of arrow 50, said force acting against the spring force of said element 45, said hollow bolt 42 may be displaced in the direction of its longitudinal central axis 51. For this purpose, said housing 29 is provided with an internal hollow space 52 surrounded by a side wall 53 and a front wall 54. Said front wall is provided with a cavity 55 through which said hollow bolt 42 extends in the releasing position.

One end area 56 of said hollow bolt 42 in said receiving area 30 for said cartridge 25 is e.g. formed by a recess and projection, respectively (shown in the figure) which, on the inside, form the stop surface 43 for said trunnion 31 of said cartridge 25 and, on the outside, form the support surface 47 for said spring 46. Preferably, a mounting or stop element 58, e.g. a screw nut 59 and a sealing element 60, particularly a sealing ring, are provided in the further end area 57 of said hollow bolt 42. In the locking position of said coupling device 24, said stop element 58 and said sealing element 60 are adjacent to the front wall 54 of said housing 29 and are pre-stressed by said spring 46, so that said hollow space 52 of said housing 29 is sealed against the outside in the locking position. In the example shown, the locking position of said coupling device 24 is defined by said stop element 58 or said sealing element 60 adjacent to said front wall 54.

The position of said coupling device 24 on said supply device 2, particularly said tank 6, is fixed by means of a fixing means 61, particularly a thread, with the longitudinal central axis 51 of said coupling device 24 preferably being essentially perpendicular to a horizontal standing surface of said supply device 2. A sealing element between said tank 6 and said housing 29 may serve to seal the chamber 27 inside said tank 6. Said sealing element is not described in detail, but it is shown in FIG. 2.

Said receiving area 30 of said housing 29 for said cartridge 25 is provided with a stop surface 62 defining an end position of said cartridge 25 when mounting it on said coupling device 24. For this purpose, said stop surface 35 of said dispenser 28 contacts said stop surface 62 of said receiving area 30. Preferably, said stop surface 62 is beveled at an angle 63 with respect to said longitudinal central axis 51, which angle corresponds to said angle 36 of said stop surface 35 of said dispenser 28.

Preferably, said output orifice 41 of said metering device 38 is provided in the end area 57 of said hollow bolt 42 opposite said input orifice 40. In particular, said hollow bolt 42 is provided with at least one through bore(s) 64 (two bores in FIG. 2) extending through the thickness of a wall 65 of said hollow bolt 42 transversely with respect to said longitudinal central axis 51.

In such embodiment, in the locking position of said coupling device 24 said bores 64 are located inside said hollow space 52 of said housing 29 and are closed or not accessible from outside. In the locking position of said coupling device 24, said channel 39 is sealed off from said chamber 27 inside said tank 6 by said side wall 53, said front wall 54, and said sealing element 60.

Said coupling device 24 is brought from the locking position into the releasing position by subjecting said stop surface 43 of said hollow bolt 42 to a force in the direction of arrow 50, which force is stronger than the spring force of said element 45 acting in the opposite direction. If this is the case, said hollow bolt 42 will be moved in the direction of said arrow 50 until a displacement range 66 is reached, as shown in FIG. 3. The adjustment range of said hollow bolt 42 is limited to said displacement range 66 by a stop on said housing 29 limiting the movement of any operating element. In the example, said stop is formed by said stop surface 62 in said receiving area 30 of said housing 29, positioning said dispenser 28 of said cartridge 25 in the direction of said longitudinal central axis 51 when mounting it on said coupling device 24. While in the final releasing position of said coupling device 24 said stop surface 35 of said dispenser 28 rests on said stop surface 62 of said housing 29, said front surface 44 of said trunnion 31 will first contact said stop surface 43 of said hollow bolt 42, so that when said trunnion 31 is moved in the direction of said arrow 50, said hollow bolt 42 will be displaced with respect to said housing 29 until said dispenser 28 comes to rest on said stop surface 62 and said displacement range 66 is reached.

Said displacement range 66 is also determined by the constructive embodiment of said dispenser 28. In the present example, said displacement range is essentially one length 67 of said trunnion minus one width 68 of said projection 49.

FIG. 3 shows said coupling device 24 in the releasing position. This figure shows that said output orifice 41 of said channel 39 is now located outside said housing 29, and a flow connection is established between said chamber 27 inside said tank 6 and said channel 39 of said coupling device 24.

Now that said cartridge 25 is open (as shown in FIG. 4), the liquid 9 present in its interior chamber 26 may flow into the input orifice 40 of said channel 39 and, via said channel 39, into said tank 6. It should be noted that an additional step may be required to open said cartridge 25, depending on the type of cartridge used.

In the present example, a cartridge 25 having a locking mechanism 69 is used, which has to be deactivated in the releasing position of said coupling device 24, as shown in FIGS. 3 and 4. Deactivation of said locking mechanism 69 is effected by moving said dispenser 28 relatively to the remaining container 70 of said cartridge 25 in the direction of double arrow 71. Thus, said locking mechanism 69 will release the chamber 26 inside said container 70, and said liquid 9 will exit from said output orifice 33 of said dispenser 28. Said relative movement between said dispenser 28 and said container 70 of said cartridge 25 is easily effected by applying a force to said container 70 while said dispenser 28 is located in the receiving area 30 of said coupling device 24. In FIGS. 3 and 4, this is symbolized by a distance 72 by which said container 70 is moved in the direction of said dispenser 28 until it reaches the final position (FIG. 4). Said dispenser 28, comprising said trunnion 31 and a stop having a stop surface 35, is preferably made of plastic and is located so as to be displaceable with respect to said container 70, e.g. via an elastic cushion 73. FIG. 4 shows the filling position of said coupling device 24 and said cartridge 25 to fill said tank 6 with liquid 9, with said elastic cushion 73 being compressed accordingly.

According to the present invention, said elastic cushion 73 will expand laterally when applying pressure after said stop surface 35 has contacted said support surface 62, and will adjust to said receiving area 30, particularly to said side surfaces and/or said front surface and/or said stop surface 35 of said coupling device 24, as shown in FIG. 4. Advantageously, this provides a sealing function so that any liquid 9 exiting said cartridge 25 may not escape to the back, i.e. said liquid 9, being under pressure, may only escape through said bore 64 because the back part of said coupling device 24 is sealed.

It may be noted that it is possible, of course, to use cartridges 25 having other locking mechanisms 69 known from prior art. They may be filled with water, which may optionally contain various admixtures. Moreover, they may be partly filled with compressed gas or they may be equipped with any pressure producing device to produce excessive pressure in said container 70.

With respect to said coupling device 24 it should be noted that it may have a handling area 75 on one outside 74 of said housing 29, which handling area may e.g. be structured or embossed (76) to render said coupling device 24 easy to handle and mount. Of course, recesses or projections, roughenings, rubber elements, knobs or similar may be provided in said handling area 75 for the same purpose.

Furthermore, it should be noted that, in the filling position, a lock may be provided between said dispenser 28 and said coupling device 24 so that said cartridge 25 will automatically remain open and may be emptied. FIG. 5 shows an example of such locking mechanism 77. Said locking mechanism 77 is formed by a thread 78 in the receiving area 30 of said housing 29 and a thread 79 on said dispenser 28. When said cartridge 25 is mounted on said coupling device 24, as mentioned above, and then said cartridge 25 is twisted to allow said threads 78, 79 to engage, said cartridge 25 may be fixed to said coupling device 24 in its open position. Furthermore, said locking mechanism 77 may, apart from fixing said cartridge 25, also cause said cartridge 25 to open, but this is not shown in detail.

FIG. 6 is a top view of the example of said coupling device 24. It shows that said housing 29 and said hollow bolt 42 are essentially cylindrical. An optional element of said locking mechanism 77 is indicated by a broken line.

FIGS. 2 and 7 further show that preferably a degassing device 80 is assigned to said tank 6. Said degassing device 80 is e.g. formed by a pressure control valve 81 so that any excessive pressure in said tank 6, which may occur when said tank 6 is filled with said liquid 9, may be relieved. The air in said tank 6 displaced by said liquid 9 exits through an opening 82 of said degassing device 80. Preferably, said degassing device 80 will lock automatically, as symbolized by a spring element 83 in FIG. 2.

Moreover, FIG. 7 shows that a locking member 84 may be provided in said feed line 8 or in said cutting torch 7, which member may interrupt liquid supply to said cutting torch 7 if necessary. If said locking member 84 is activated, liquid 9 supplied to said cutting torch 7 via said feed line 8 may not exit from said cutting torch 7. Thus, said feed line 8 and said cutting torch 7 may be supplied with or subjected to liquid 9, while optionally a defined pressure may be generated in said feed line 8 via said feeding device 20. Furthermore, a degassing device 85 may be assigned to said cutting torch 7 and/or said feed line 8, to allow escape of any gas, particularly air, present in said feed line 8 or in said cutting torch 7 that may have been sucked up by said feeding device 20 when said tank 6 was empty. Thus, gas enclosures in the supply of liquid to said cutting torch 7 may be avoided after said tank 6 has been re-filled so that a cutting process may be started without problems.

In an individual embodiment, the present invention further relates to a control device 4 for said water vapor cutting device 1, and to a method for controlling said water vapor cutting device 1.

FIG. 7 shows an embodiment of said water vapor cutting device 1. The control device 4 has a storage element 86 storing process parameters and process procedures, preferably in digital form.

The components of said water vapor cutting device 1 may be controlled according to said stored performance definitions of various process procedures. Said control device 4 may be provided with a microprocessor control for processing digital signals and data. Said control device 4 may be connected to the controlled components via signal lines, e.g. a data bus. Such kind of particularly digital control systems are known in the art and are therefore not disclosed or explained in greater detail here.

In addition to a process procedure for carrying out a cutting process, wherein said cutting torch 7 discharges a cutting beam to work a work piece 23, said storage element 86 also contains a process procedure for carrying out a maintenance mode or maintenance procedure, particularly a so-called filling mode. In said maintenance mode, operability of said water vapor cutting device 1 is checked and/or restored after said water vapor cutting device 1 has been maintained. For example, said maintenance mode may be carried out after said tank 6 has been filled or re-filled with liquid 9 to make sure that there is sufficient liquid 9 in said feed line 8 and said cutting torch 7 to carry out a cutting process properly. In said maintenance mode, said control device 4 contacts said feeding device 20 for said liquid 9 so that said liquid 9 is supplied to said cutting torch 7 via said feed line 8 leading thereto.

Said control device 4 is coupled with an activating element 87 that may be activated or actuated to initialize said maintenance mode. Said activating element 87 is preferably formed by an operating element 88, particularly a key 89. Said operating element 88 may be assigned to said input and/or output device 17 on said supply device 2, or it may be provided on said cutting torch 7 as an individual element or combined with said operating element 18. When carrying out said maintenance procedure, the relevant process parameters are called from a storage element, and said feeding device 20 for said liquid 9, particularly said pump 21, and said locking element 5 and/or said locking member 84 are controlled accordingly. Preferably, in said maintenance mode no electric energy is transmitted to said cutting torch 7 to produce an arc, and said control device 4 will control said current source 3 accordingly.

Optionally, said water vapor cutting device 1 is provided with a flow control device or a pressure control device coupled with said control device 4 for detecting the distribution of liquid in said cutting torch 7 and in said feed line 8. For example, during a maintenance procedure said flow control device or pressure control device will check whether said cutting torch 7 or said feed line 8 are well supplied with said liquid 9 or whether there is a defined minimum pressure in said line 7. When said flow control device or pressure control device detect that said liquid is properly distributed, the maintenance mode will be stopped.

If said activating element 87 is formed by an operating element 88, the maintenance mode may be initialized by maintenance personnel by hand after filling said tank 6 by actuating said operating element 82.

Optionally, an activating element 87 (represented by broken lines in FIG. 7) designed as a detector or sensor may be assigned to said tank 6 or said coupling device 24, which will automatically inform said control device 4 whether or not said tank 6 has been filled, i.e. whether or not a cartridge 25 has been coupled to said coupling device. This makes sure that said maintenance mode may only be carried out after said tank 6 has been filled, and said maintenance mode may optionally be called automatically by said control device 24. Moreover, said control device 4 may block a cutting process by said cutting torch 7 until the maintenance mode has been carried out.

In another possible embodiment, an operating element 88 and a detector are provided to allow said maintenance mode to be initialized by hand via said operating element 88 according to the states detected by said detector. Furthermore, it is also possible to carry out a maintenance mode every time said operating element 82 is actuated or a cutting process is initialized, so that operability of said cutting device 1 may be checked as a security measure.

The individual embodiments shown in FIGS. 1 to 7 may be the subject matter of individual solutions according to the present invention. Such tasks and solutions according to the present invention may be derived from the detailed descriptions of said figures.

What is claimed is:

1. A coupling device used for producing a flow path between a tank of a water vapor cutting device and a liquid-filled cartridge, wherein said coupling device comprises a housing provided with a receiving area formed therein for mounting a cartridge on said housing, and which coupling device comprises a channel provided with an input orifice fluidically connectable to said cartridge and with an output orifice fluidically connectable to an external surrounding area, wherein a metering device is arranged in said housing, which device defines a locking position in which no cartridge is mounted on said housing and said output orifice is locked, and which metering device also defines a releasing position into which said metering device may be brought by mounting a cartridge on said housing, and in which said output orifice is released, wherein said channel with said output orifice is arranged in a hollow bolt held in said housing so as to be displaceable in the direction of a longitudinal central axis, wherein said output orifice is provided in an end area of said hollow bolt, and wherein in the end area of said hollow bolt at least one bore is provided extending across the thickness of a wall in a transverse direction with respect to said longitudinal central axis.

2. The coupling device according to claim 1, wherein in the locking position, said output orifice is covered or locked by a side wall of said housing.

3. The coupling device according to claim 1, wherein in the releasing position, said output orifice may be provided outside said housing by displacing said output orifice via a defined displacement range.

4. The coupling device according to claim 3, wherein the receiving area of said metering device is provided with a stop surface for said cartridge, said surface defining said displacement range.

5. The coupling device according to claim 4, wherein said stop surface is beveled at an angle with respect to said longitudinal central axis of said housing.

6. The coupling device according to claim 1, wherein in a filling position, wherein an output orifice of said cartridge is open towards its interior chamber and said metering device is in the releasing position, a flow connection is provided between said interior chamber, said cartridge, and said channel.

7. The coupling device according to claim 1, wherein said metering device is provided with an elastic element holding said hollow bolt or said output orifice in the locking position.

8. The coupling device according to claim 1, wherein said housing is shaped like a tube.

9. The coupling device according to claim 1, wherein the end area of said hollow bolt is provided with a stop element and/or a sealing element which is adjacent to a front surface of said housing in the locking position.

10. A water vapor cutting device provided with at least one tank for a liquid, a current source, a control device, and a cutting torch for producing a cutting beam exiting from a nozzle, which torch is connected to said tank via a feed line, wherein said tank is provided with a coupling device according to claim 1, wherein in the releasing position of said coupling device a chamber inside said tank is fluidically connected to said output orifice of said channel of said coupling device.

11. The cutting device according to claim 10, wherein said tank is provided with a de-gassing device.

12. The cutting device according to claim 10, wherein said cutting torch and/or said feed line are provided with a de-gassing device.

13. The cutting device according to claim 10, wherein said cutting torch and/or said feed line have a locking member connected to said control device.

14. A coupling device used for producing a flow path between a tank of a water vapor cutting device and a liquid-filled cartridge, wherein said coupling device comprises a housing provided with a receiving area formed therein for mounting a cartridge on said housing, and which coupling device comprises a channel provided with an input orifice fluidically connectable to said cartridge and with an output orifice fluidically connectable to an external surrounding area, wherein a metering device is arranged in said housing, which device defines a locking position in which no cartridge is mounted on said housing and said output orifice is locked, and which metering device also defines a releasing position into which said metering device may be brought by mounting a cartridge on said housing, and in which said output orifice is released, wherein in the releasing position, said output orifice may be provided outside said housing by displacing said output orifice via a defined displacement range, and wherein said dispenser of said cartridge is formed by a trunnion, and by a stop surface provided in an end area of said trunnion, with said displacement range between the locking and the releasing positions being determined by one length of said trunnion.

15. The coupling device according to claim 14, wherein in an end area wherein said input orifice is provided, said hollow bolt is provided with a stop surface for said trunnion of said dispenser of said cartridge.

* * * * *